United States Patent
Moriya et al.

(10) Patent No.: US 8,531,819 B2
(45) Date of Patent: Sep. 10, 2013

(54) SOLID ELECTROLYTIC CAPACITOR AND METHOD OF MANUFACTURING THE SAME

(75) Inventors: Osamu Moriya, Ikoma (JP); Kazuya Niki, Hirakata (JP); Hiroya Nishimoto, Higashiosaka (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 15 days.

(21) Appl. No.: 13/102,425

(22) Filed: May 6, 2011

(65) Prior Publication Data

US 2011/0273816 A1   Nov. 10, 2011

(30) Foreign Application Priority Data

May 10, 2010   (JP) ................................. 2010-108165

(51) Int. Cl.
*H01G 9/00*   (2006.01)

(52) U.S. Cl.
USPC ........... 361/523; 361/524; 361/525; 361/528; 361/529

(58) Field of Classification Search
USPC .......................... 361/523, 524, 525, 528–529
See application file for complete search history.

(56) References Cited

U.S. PATENT DOCUMENTS

2011/0002088 A1 *  1/2011  Aoyama et al. ............... 361/524

FOREIGN PATENT DOCUMENTS

JP   2008-091784 A   4/2008

* cited by examiner

*Primary Examiner* — Jayprakash N Gandhi
*Assistant Examiner* — Hung Dang
(74) *Attorney, Agent, or Firm* — Westerman, Hattori, Daniels & Adrian, LLP (57) ABSTRACT

A solid electrolytic capacitor includes a capacitor element, a conductive member, an electrical insulating member, and a tubular member. The element has an element body with a cathode layer, and an anode lead. The conductive member is placed to face a first end surface of the body through which the lead is pulled out. The electrical insulating member is placed between the conductive member and the body. The lead passes through a through hole defined in the electrical insulating member. A tip end portion of the lead is inserted into a through hole or a closed end hole defined in the conductive member to be electrically connected to the conductive member. Insertion of the body into the tubular member causes the tubular member to cover at least part of a side surface of the body, while making electrical connection between the tubular member and the cathode layer.

9 Claims, 11 Drawing Sheets

SOLID ELECTROLYTIC CAPACITOR AND METHOD OF MANUFACTURING THE SAME

INCORPORATION BY REFERENCE

The Japanese patent application Number 2010-108165, upon which this patent application is based, is hereby incorporated by reference.

BACKGROUND OF THE INVENTION

1. Field of the Invention

The invention relates to a solid electrolytic capacitor with anode and cathode terminals, and a method of manufacturing the solid electrolytic capacitor.

2. Description of Related Art

Figure 11:
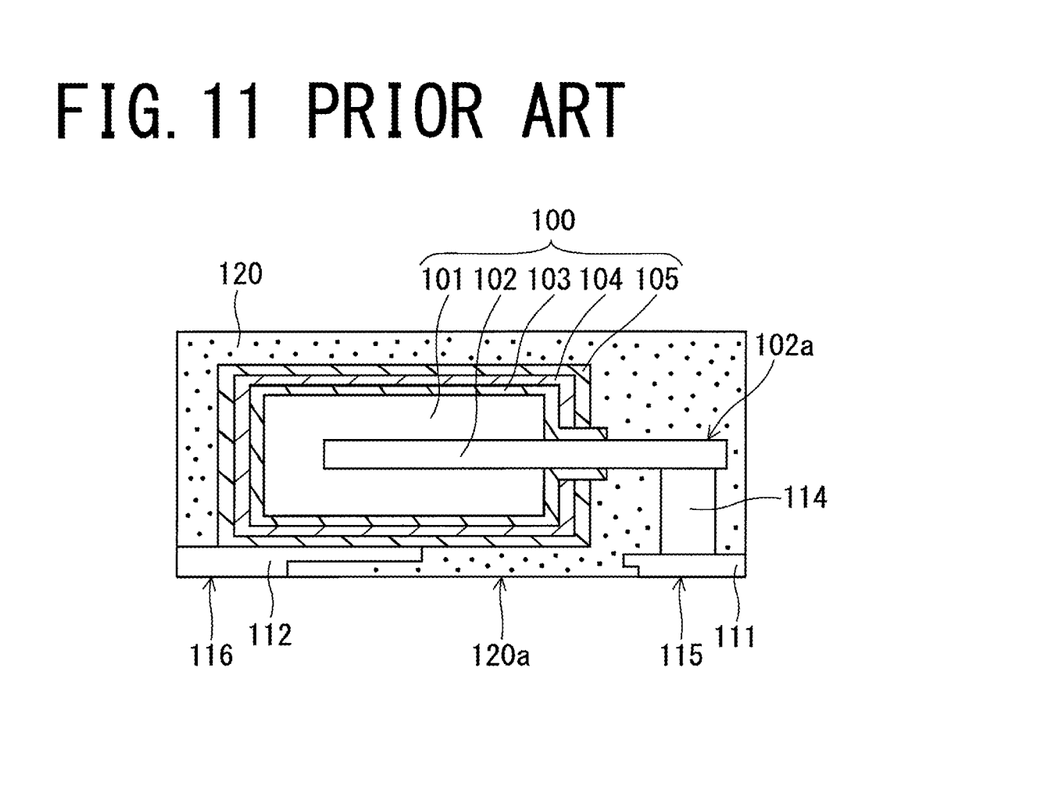
FIG. 11 is a sectional view of a conventional solid electrolytic capacitor.

FIG. 11 is a sectional view of a conventional solid electrolytic capacitor. As shown in FIG. 11, the conventional solid electrolytic capacitor includes a capacitor element 100, an anode terminal 111, and a cathode terminal 112 that are buried in an exterior resin 120. The capacitor element 100 includes an anode body 101, an anode lead 102 implanted in the anode body 101, a dielectric layer 103 formed on a surface of the anode body 101, an electrolyte layer 104 formed on the dielectric layer 103, and a cathode layer 105 formed on the electrolyte layer 104.

Anode and cathode terminal surfaces 115 and 116 of the anode and cathode terminals 111 and 112 respectively are formed in a lower surface 120a of the exterior resin 120. A pillow member 114 is electrically connected with welding means such as laser welding to the surface of the anode terminal 111 opposite the anode terminal surface 115. A tip end portion 102a of the anode lead 102 of the capacitor element 100 is electrically connected to an end portion of the pillow member 114. The lower surface of the cathode layer 105 of the capacitor element 100 is electrically connected to the surface of the cathode terminal 112 opposite the cathode terminal surface 116.

In the conventional solid electrolytic capacitor, the ratio of volume of the capacitor element 100 to the solid electrolytic capacitor is low as the volume of the exterior resin 120 should be considered. Further, in the conventional solid electrolytic capacitor, only the lower surface of the tip end portion 102a of the anode lead 102 is connected to the pillow member 114, and only the lower surface of the cathode layer 105 of the capacitor element 100 is connected to the cathode terminal 112 as shown in FIG. 11. This reduces a contact area between the anode lead 102 and the pillow member 114, and a contact area between the cathode layer 105 and the cathode terminal 112, thereby increasing the ESR (equivalent series resistance) of the solid electrolytic capacitor.

In the solid electrolytic capacitor, an electrical path is formed between the anode and cathode terminal surfaces 115 and 116 through the capacitor element 100. The conventional solid electrolytic capacitor has a long electrical path between the anode and cathode terminal surfaces 115 and 116 as a result of a long distance therebetween, thereby increasing inductance between the anode and cathode terminal surfaces 115 and 116, namely the ESL (equivalent series inductance) of the solid electrolytic capacitor.

SUMMARY OF THE INVENTION

A solid electrolytic capacitor of the invention includes a capacitor element, a conductive member, an electrical insulating member, and a tubular member made of a conductive material. The capacitor element has an element body with a cathode layer that forms at least a partial region of the outer circumference of the element body, and an anode lead pulled out of the element body through the outer circumference of the element body. The outer circumference of the element body is defined by a first end surface through which the anode lead is pulled out, a second end surface opposite the first end surface, and a side surface extending like a tube from the outer periphery of the first end surface to the outer periphery of the second end surface. The conductive member is placed to face the first end surface of the element body. The electrical insulating member is placed between the conductive member and the element body. A through hole through which the anode lead passes is defined in the electrical insulating member, and a through hole or a closed end hole into which a tip end portion of the anode lead is inserted is defined in the conductive member. The tip end portion of the anode lead is electrically connected to the inner circumference of the through hole or the closed end hole of the conductive member. Insertion of the element body of the capacitor element into the tubular member causes the tubular member to cover at least part of the side surface of the element body, while making electrical connection between the inner circumference of the tubular member and the cathode layer of the capacitor element. An exposed surface of the conductive member forms an anode terminal surface, and the outer circumference of the tubular member forms a cathode terminal surface.

A method of manufacturing a solid electrolytic capacitor of the invention includes first and second steps. The solid electrolytic capacitor includes a capacitor element, an anode terminal, and a cathode terminal. The capacitor element has an element body with a cathode layer that forms at least a partial region of the outer circumference of the element body, and an anode lead pulled out of the element body through the outer circumference of the element body. The outer circumference of the element body is defined by a first end surface through which the anode lead is pulled out, a second end surface opposite the first end surface, and a side surface extending like a tube from the outer periphery of the first end surface to the outer periphery of the second end surface. The anode terminal is electrically connected to the anode lead. The cathode terminal is electrically connected to the cathode layer. In the first step, the element body of the capacitor element is inserted into a tubular member made of a conductive material and which is to form the cathode terminal to form electrical connection between the inner circumference of the tubular member and the cathode layer of the capacitor element. In the second step, an electrical insulating member in which a through hole is defined, and a conductive member in which a through hole or a closed end hole is defined and which is to form the anode terminal are prepared. The anode lead of the capacitor element is caused to pass through the through hole of the electrical insulating member, and thereafter a tip end portion of the anode lead is inserted into the through hole or the closed end hole of the conductive member, thereby making electrical connection between the inner circumference of the through hole or the closed end hole of the conductive member and the tip end portion of the anode lead.

DETAILED DESCRIPTION OF THE EMBODIMENTS

An embodiment of the invention is described in detail below by referring to drawings.

Figure 1:
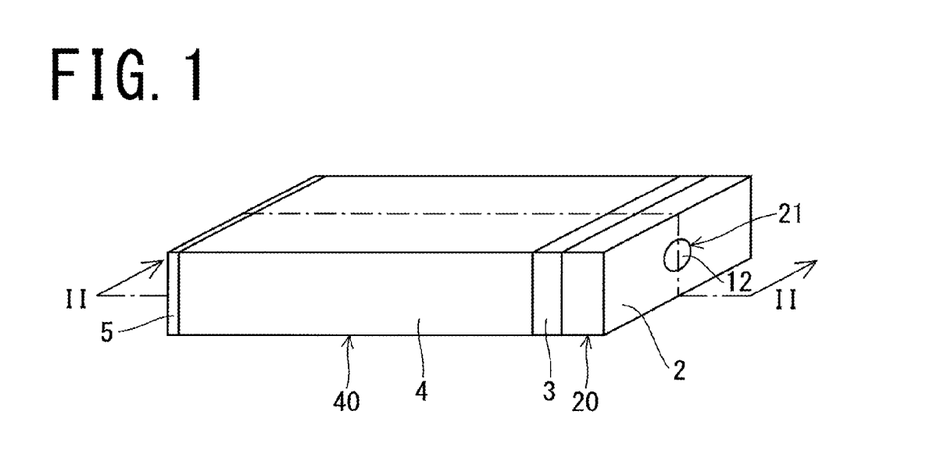
FIG. 1 is a perspective view of a solid electrolytic capacitor of an embodiment of the invention.
Figure 2:
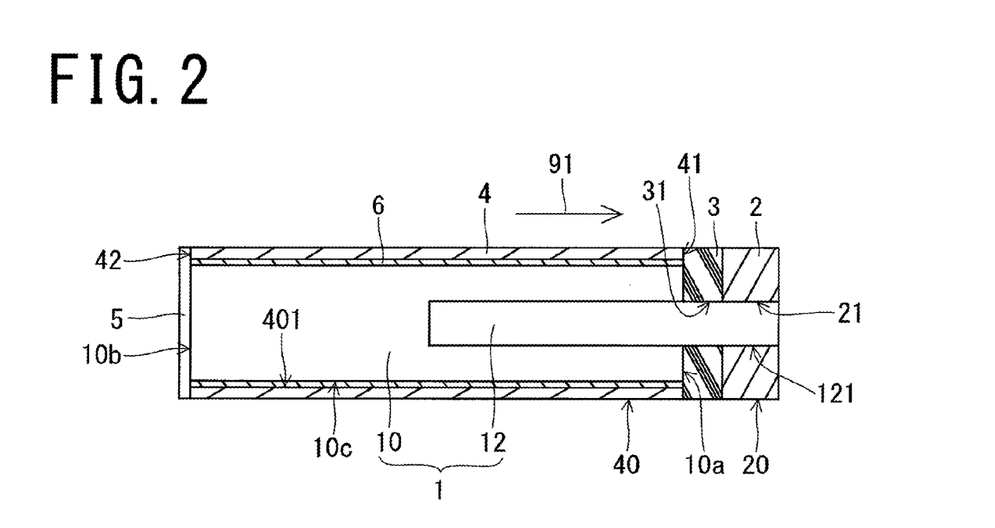
FIG. 2 is a sectional view taken along a line II-II shown in FIG. 1.

FIG. 1 is a perspective view of a solid electrolytic capacitor of the embodiment of the invention. FIG. 2 is a sectional view taken along a line II-II shown in FIG. 1. As shown in FIG. 2, the solid electrolytic capacitor of the embodiment includes a solid electrolytic capacitor element 1 with an element body 10 in the form of a rectangular parallelepiped, and an anode lead 12 pulled out of the element body 10 through its outer circumference. The outer circumference of the element body 10 is defined by a first end surface 10a through which the anode lead 12 is pulled out, a second end surface 10b opposite the first end surface 10a, and a side surface 10c extending like a tube from the outer periphery of the first end surface 10a to the outer periphery of the second end surface 10b in a direction 91 in which the anode lead 12 extends.

Figure 3:
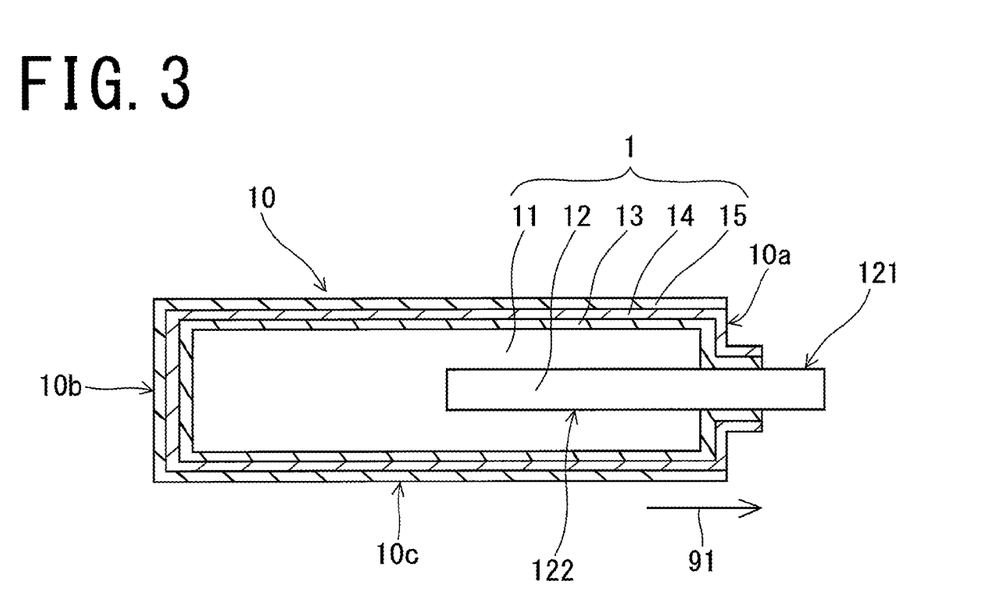
FIG. 3 is a sectional view of a capacitor element of the solid electrolytic capacitor.

FIG. 3 is a sectional view of the specific structure of the capacitor element 1. As shown in FIG. 3, the capacitor element 1 includes an anode body 11 in the form of a rectangular parallelepiped, a cylindrical anode lead 12 implanted in the anode body 11, a dielectric layer 13 formed on a surface of the anode body 11, an electrolyte layer 14 formed on the dielectric layer 13, and a cathode layer 15 formed on the electrolyte layer 14.

The anode body 11 is constructed of a porous sintered body made of a valve acting metal. Examples of the valve acting metal include tantalum, niobium, titanium, and aluminum. The anode lead 12 has a base end portion 122 buried in the anode body 11, and a tip end portion 121 pulled out of the anode body 11 through its surface. The anode lead 12 is made of a valve action metal the type of which is the same as or different from the valve action metal constituting the anode body 11. The anode body 11 and the anode lead 12 are electrically connected to each other.

The dielectric layer 13 is constructed of an oxide film formed on the surface of the anode body 11. The oxide film is formed by dipping the anode body 11 into an electrolytic solution such as a phosphorus solution and an adipic acid solution, and by electrochemically oxidizing the surface of the anode body 11 (anodic oxidation).

The electrolyte layer 14 is formed on the dielectric layer 13 by using a conductive inorganic material such as manganese dioxide, or a conductive organic material such as TCNQ (tetracyano-quinodimethane) complex salt and conductive polymer. The cathode layer 15 is constructed of a carbon layer (not shown) formed on the electrolyte layer 14, and a silver paint layer (not shown) formed on the carbon layer. The electrolyte layer 14 and the cathode layer 15 are electrically connected to each other.

The element body 10 includes the anode body 11, the dielectric layer 13, the electrolyte layer 14, and the cathode layer 15. The cathode layer 15 forms at least the second end surface 10b and the side surface 10c of the outer circumference of the element body 10.

In the capacitor element 1, the tip end portion 121 of the anode lead 12 forms the anode part of the capacitor element 1, and the cathode layer 15 forms the cathode part of the capacitor element 1. The anode and cathode parts are electrically isolated from each other by the dielectric layer 13.

As shown in FIGS. 1 and 2, the solid electrolyte capacitor of the embodiment further includes a conductive plate 2 as a conductive member, an electrical insulating plate 3 as an electrical insulating member, and a tubular member 4. The conductive plate 2 is placed to face the first end surface 10a of the element body 10. The electrical insulating plate 3 is placed between the conductive plate 2 and the element body 10. The tubular member 4 is made of a conductive material. The conductive plate 2, the electrical insulating plate 3, and the tubular member 4 are each rectangular in shape of an outer periphery of a cross section vertical to the direction 91 in which the anode lead 12 extends, and their shapes of the outer peripheries of these cross sections are substantially the same. A sum of the thicknesses of the electrical insulating plate 3 and the conductive plate 2 is set such that it is substantially the same as the length of an exposed part of the anode lead 12 pulled out of the element body 10.

A through hole 31 through which the anode lead 12 passes is defined in the central portion of the electrical insulating plate 3. The electrical insulating plate 3 is adhesively fixed to a surface of the conductive plate 2. The electrical insulating plate 3 may also be adhesively fixed to the first end surface 10a of the element body 10 and/or to an open end surface 41 of the tubular member 4. Or, the electrical insulating plate 3 may be held between the element body 10 and the conductive plate 2.

A through hole 21 into which the tip end portion 121 of the anode lead 12 is inserted is defined in the central portion of the conductive plate 2. The tip end portion 121 of the anode lead 12 is electrically connected to the entire inner circumference of the through hole 21. More specifically, the tip end portion 121 of the anode lead 12 is joined with welding means such as laser welding and resistance welding to the entire inner circumference of the through hole 21 of the conductive plate 2. Or, the tip end portion 121 of the anode lead 12 is press-fitted into the through hole 21 of the conductive plate 2.

The tubular member 4 has a thickness of about 0.1 mm, and has a shape that allows the element body 10 to be inserted into the tubular member 4. More specifically, the shape of the tubular member 4 is such that a small space is left between the side surface 10c of the element body 10 and an inner circumference 401 of the tubular member 4 after the element body 10 is inserted into the tubular member 4. Further, the length of the tubular member 4 defined between open end surfaces 41 and 42 of the tubular member 4 is set to be substantially the same as the length of the element body 10 defined in the direction 91 in which the anode lead 12 extends.

The element body 10 is inserted into the tubular member 4, and the first end surface 10a of the element body 10 and the open end surface 41 of the tubular member 4 are aligned in the same plane, so that the side surface 10c of the element body 10 is entirely covered by the tubular member 4. A conductive adhesive 6 is placed between the side surface 10c of the capacitor element 1 and the inner circumference 401 of the tubular member 4, by which the cathode layer 15 of the capacitor element 1 is electrically connected to the entire inner circumference 401 of the tubular member 4.

In the solid electrolytic capacitor of the embodiment, the conductive plate 2 and the tubular member 4 form the anode and cathode terminals of the solid electrolytic capacitor respectively. Further, an exposed surface of the conductive plate 2 forms an anode terminal surface 20, and the outer circumference of the tubular member 4 forms a cathode terminal surface 40. The anode and cathode terminal surfaces 20 and 40 are to be electrically connected to interconnect lines on a circuit board when the solid electrolytic capacitor is mounted on the circuit board. In the embodiment, a region of the exposed surface of the conductive plate 2, and a region of the outer circumference of the tubular member 4 that are to define the lower surface of the solid electrolytic capacitor in FIG. 2 function as the anode and cathode terminal surfaces 20 and 40 respectively.

Also, in the solid electrolytic capacitor of the embodiment, a covering member 5 for covering the entire second end surface 10b of the element body 10 is adhesively fixed to the second end surface 10b and/or to the open end surface 42 of the tubular member 4. The covering member 5 may be made of a conductive material or an electrical insulating material.

A method of manufacturing the solid electrolytic capacitor of the embodiment is described in detail next by referring to drawings. This method includes first to third steps performed in this order.

Figure 4A:
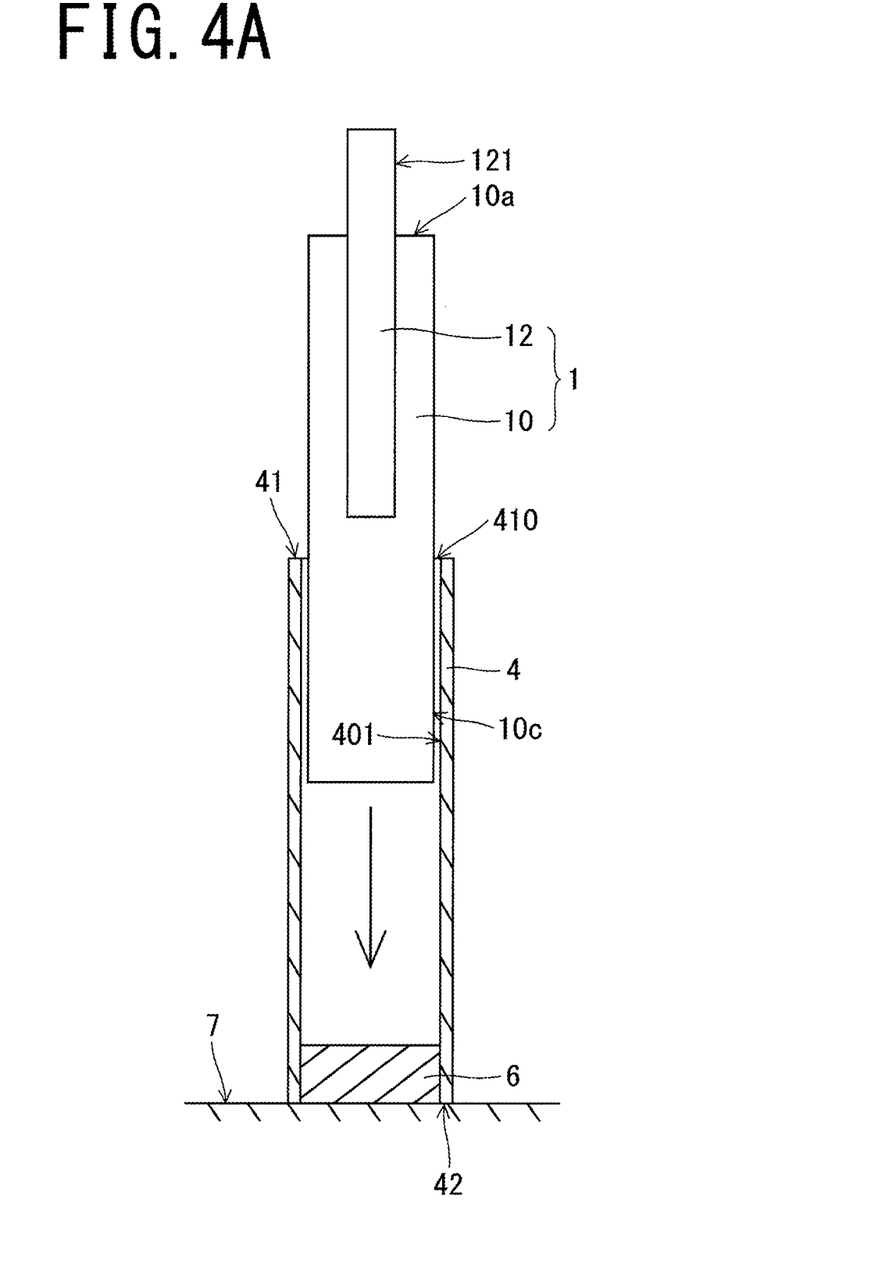
FIG. 4A is a sectional view referred to for description of a first step of a method of manufacturing the solid electrolytic capacitor.
Figure 4B:
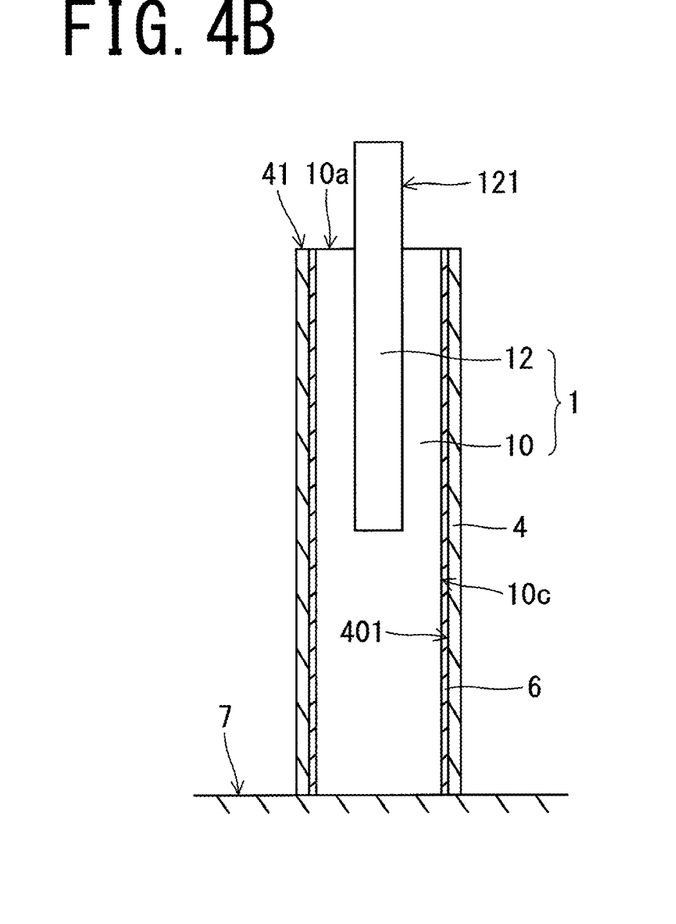
FIG. 4B is a sectional view showing a state after the first step is performed.

FIG. 4A is a sectional view referred to for description of the first step. FIG. 4B is a sectional view showing a state after the first step is performed. In the first step, the tubular member 4 made of a conductive material is prepared, and the tubular member 4 is placed in an upright position on a plane 7, so that the lower open end surface 42 of the tubular member 4 comes into surface contact with the plane 7 as shown in FIG. 4A. Next, the conductive adhesive 6 is applied into the tubular member 4, and is then accumulated in a lower area of the tubular member 4.

Next, the element body 10 is inserted through an upper opening 410 of the tubular member 4 into the tubular member 4, with the tip end portion 121 of the anode lead 12 pointing upward. The shape of the tubular member 4 is such that a small space is left between the side surface 10c of the element body 10 and the inner circumference 401 of the tubular member 4 after the element body 10 is inserted into the tubular member 4.

While the first step is performed, the conductive adhesive 6 spreads through the small space between the side surface 10c of the element body 10 and the inner circumference 401 of the tubular member 4 as shown in FIG. 4B. Thus, the conductive adhesive 6 is placed between the side surface 10c of the element body 10 and the inner circumference 401 of the tubular member 4, by which the cathode layer 15 of the capacitor element 1 is electrically connected to the entire inner circumference 401 of the tubular member 4. In the first step, the first end surface 10a of the element body 10 and the open end surface 41 of the tubular member 4 are aligned in the same plane as shown in FIG. 4B.

Figure 5A:
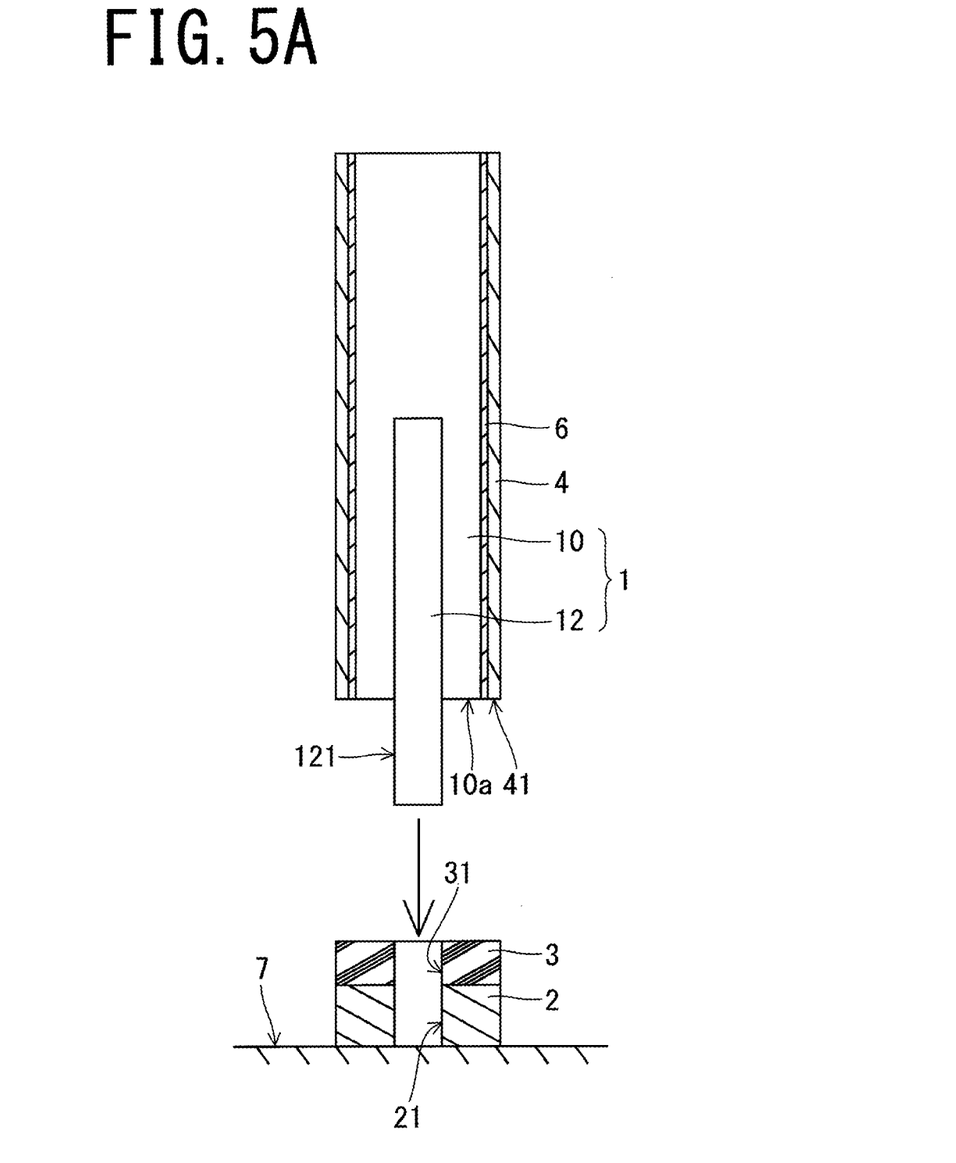
FIG. 5A is a sectional view referred to for description of a former stage of a second step of the method of manufacturing the solid electrolytic capacitor.
Figure 5B:
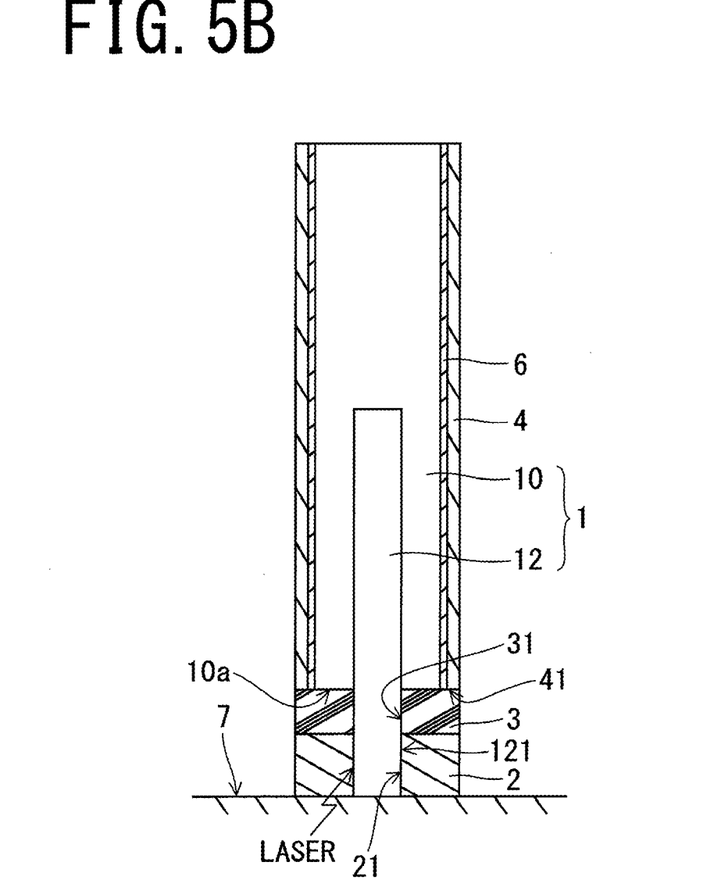
FIG. 5B is a sectional view referred to for description of a latter stage of the second step.

FIGS. 5A and 5B are sectional views referred to for description of former and latter stages of the second step respectively. As shown in FIG. 5A, the conductive plate 2 as the conductive member, and the electrical insulating plate 3 as the electrical insulating member are prepared. Here, the conductive plate 2 has the through hole 21 defined in its central portion, and the electrical insulating plate 3 has the through hole 31 defined in its central portion. Then, the conductive plate 2 is placed on the plane 7, and thereafter the electrical insulating plate 3 is placed on the conductive plate 2. At this time, the electrical insulating plate 3 is placed on the conductive plate 2 such that the through holes 21 and 31 of the conductive plate 2 and the electrical insulating plate 3 coincide with each other, and is adhesively fixed to the conductive plate 2. A sum of the thicknesses of the electrical insulating plate 3 and the conductive plate 2 is set such that it is substantially the same as the length of the tip end portion 121 of the anode lead 12.

Next, the anode lead 12 of the capacitor element 1 is inserted from above to pass through the through hole 31 of the electrical insulating plate 3 as shown in FIGS. 5A and 5B. Then, the tip end portion 121 of the anode lead 12 is inserted into the through hole 21 of the conductive plate 2. This makes contact of the first end surface 10a of the element body 10 and the open end surface 41 of the tubular member 4 with a surface of the electrical insulating plate 3. At this time, the electrical insulating plate 3 may be adhesively fixed to the first end surface 10a of the element body 10 and/or to the open end surface 41 of the tubular member 4.

The tip end portion 121 of the anode lead 12 is thereafter joined by laser welding to the entire inner circumference of the through hole 21 of the conductive plate 2 as shown in FIG. 5B, by which the tip end portion 121 of the anode lead 12 is electrically connected to the entire inner circumference of the through hole 21 of the conductive plate 2. Different welding means such as resistance welding may take the place of laser welding to join the tip end portion 121 of the anode lead 12 to the entire inner circumference of the through hole 21 of the conductive plate 2. Or, instead of employing joining with welding means, the tip end portion 121 of the anode lead 12 may be press-fitted into the through hole 21 of the conductive plate 2.

Figure 6:
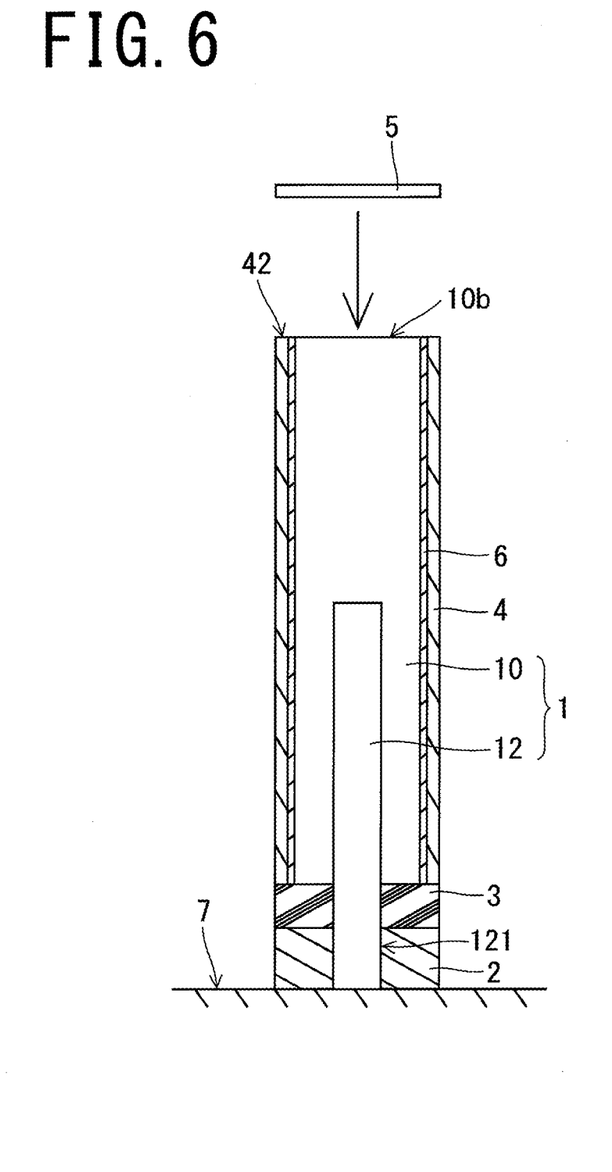
FIG. 6 is a sectional view referred to for description of a third step of the method of manufacturing the solid electrolytic capacitor.

FIG. 6 is a sectional view referred to for description of the third step. As shown in FIG. 6, the covering member 5 is prepared, and the covering member 5 is adhesively fixed to the second end surface 10b of the element body 10 and/or to the open end surface 42 of the tubular member 4. The covering member 5 may be made of a conductive material or an electrical insulating material. As a result, the second end surface 10b of the element body 10 is entirely covered by the covering member 5.

The structure of the solid electrolytic capacitor of the embodiment allows formation of the solid electrolytic capacitor without using an exterior resin. Thus, the ratio of volume of the capacitor element 1 to the solid electrolytic capacitor is higher than the corresponding ratio of volume in the conventional solid electrolytic capacitor formed by using an exterior resin (see FIG. 11).

More specifically, as seen from TABLE 1, the width (W), the depth (D), and the height (H) of the solid electrolytic capacitor were set at 7.3 mm, 4.3 mm, and 1.8 mm respectively. In this case, in the structure of the conventional solid electrolytic capacitor (see FIG. 11), the anode body 101 of the capacitor element 100 measured 4.33 mm in width (W), 3.11 mm in depth (D), and 0.78 mm in height (H) (Comparative Example). Meanwhile, in the structure of the solid electrolytic capacitor of the embodiment, the anode body 11 of the capacitor element 1 measured 5.95 mm in width (W), 3.8 mm in depth (D), and 1.3 mm in height (H) (Working Example 1). This means that the anode body 101 has a volume of 9.7 mm$^3$ in the conventional solid electrolytic capacitor, whereas the anode body 11 has a volume of 28.5 mm$^3$ in the solid electrolytic capacitor of the embodiment that is about three times the corresponding volume in the conventional solid electrolytic capacitor.

Even if the height (H) of the solid electrolytic capacitor is reduced to 1.2 mm (Working Example 2), the anode body 11 has a volume of 15.0 mm$^3$ that is still larger than that of the anode body 101 of the conventional solid electrolytic capacitor.

TABLE 1

| | CAPACITOR SIZE W × D × H (mm) | SIZE OF ANODE BODY W × D × H (mm) | VOLUME (mm$^3$) OF ANODE BODY |
|---|---|---|---|
| WORKING EXAMPLE 1 | 7.3 × 4.3 × 1.8 | 5.95 × 3.8 × 1.3 | 28.5 |
| WORKING EXAMPLE 2 | 7.3 × 4.3 × 1.2 | 5.95 × 3.8 × 0.7 | 15.0 |
| COMPARATIVE EXAMPLE | 7.3 × 4.3 × 1.8 | 4.33 × 3.11 × 0.78 | 9.7 |

In the solid electrolytic capacitor of the embodiment, an electrical path is formed between the anode and cathode terminal surfaces 20 and 40 through the capacitor element 1. In the solid electrolytic capacitor of the embodiment, the first end surface 10a of the element body 10 and the open end surface 41 of the tubular member 4 are aligned in the same plane. This makes electrical connection between the tubular member 4 (cathode terminal) and the cathode layer 15 of the capacitor element 1 at a position near the conductive plate 2 (anode terminal). This also causes the cathode terminal surface 40 to be defined near the anode terminal surface 20, thereby making a distance between the anode and cathode terminal surfaces 20 and 40 small. Thus, the aforementioned electrical path is shorter in the solid electrolytic capacitor of the embodiment than in the conventional solid electrolytic capacitor (see FIG. 11), so that inductance between the anode and cathode terminal surfaces 20 and 40, namely the ESL (equivalent series inductance) of the solid electrolytic capacitor is reduced.

Also, in the solid electrolytic capacitor of the embodiment, the tip end portion 121 of the anode lead 12 is electrically connected to the entire inner circumference of the through hole 21 of the conductive plate 2. Further, the cathode layer 15 of the capacitor element 1 is electrically connected to the entire inner circumference 401 of the tubular member 4. What should be noted especially in the solid electrolytic capacitor of the embodiment is that the side surface 10c of the element body 10 is entirely connected electrically to the inner circumference 401 of the tubular member 4. As a result, in the solid electrolytic capacitor of the embodiment, a contract area between the anode lead 12 and the anode terminal, and a contact area between the cathode layer 15 and the cathode terminal are larger than the corresponding contact areas in the conventional solid electrolytic capacitor (see FIG. 11), thereby reducing the ESR (equivalent series resistance) of the solid electrolytic capacitor.

Further, in the solid electrolytic capacitor of the embodiment, the first end surface 10a of the element body 10 is entirely covered by the electrical insulating plate 3, the side surface 10c of the element body 10 is entirely covered by the tubular member 4, and the second end surface 10b of the element body 10 is entirely covered by the covering member 5. Thus, the solid electrolytic capacitor of the embodiment can protect the capacitor element 1 from moisture, so that the resistance to moisture of the solid electrolytic capacitor is enhanced.

The present inventors confirmed through simulations the solid electrolytic capacitor of the embodiment reduces its ESR and ESL. More specifically, simulations were conducted regarding the solid electrolytic capacitors of Working Examples 1 and 2 shown in TABLE 1, and regarding the conventional solid electrolytic capacitor of Comparative Example shown in TABLE 1. For these simulations, a tantalum wire of a diameter of 0.6 mm was used as the anode lead 12. Brass was used as a conductive material to form the tubular member 4, and the thickness of the tubular member 4 was set at 0.1 mm. Further, the thicknesses of the conductive plate 2 and the electrical insulating plate 3 were set at 0.6 mm and 0.5 mm respectively. For simulations regarding ESL, a current frequency was set at 100 MHz.

As seen from TABLE 2, results of the simulations show that the conventional solid electrolytic capacitor of Comparative Example resulted in ESR of 2.70 mΩ and ESL of 0.50 nH, whereas the solid electrolytic capacitor of Working Example 1 resulted in ESR of 1.50 mΩ and ESL of 0.19 nH, and the solid electrolytic capacitor of Working Example 2 resulted in ESR of 1.65 mΩ and ESL of 0.15 nH. That is, it was confirmed that the solid electrolytic capacitor of the embodiment reduces ESR and ESL.

TABLE 2

| | ESR (mΩ) | ESL (nH) 100 MHz |
|---|---|---|
| WORKING EXAMPLE 1 | 1.50 | 0.19 |
| WORKING EXAMPLE 2 | 1.65 | 0.15 |
| COMPARATIVE EXAMPLE | 2.70 | 0.50 |

Figure 7:
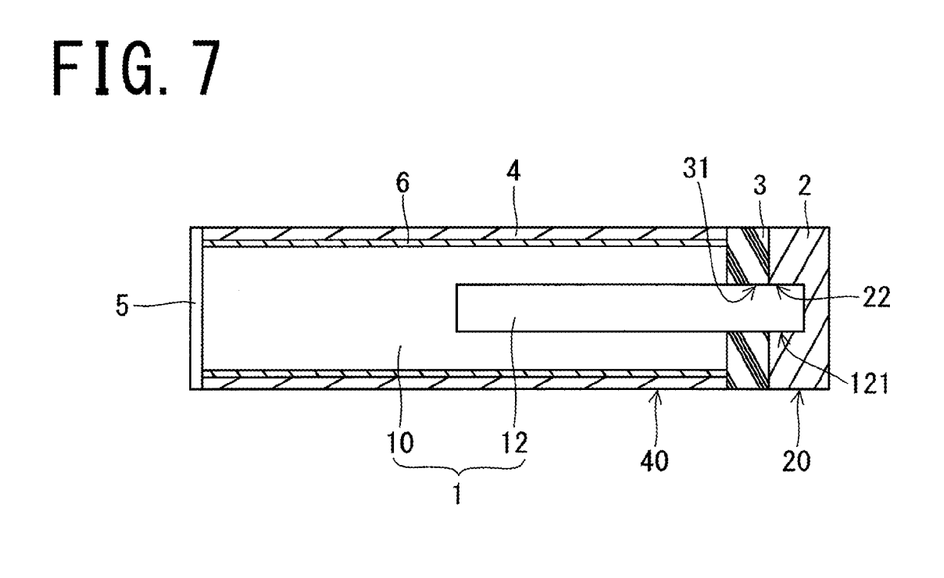
FIG. 7 is a sectional view taken along the same line as the line II-II shown in FIG. 1, and which shows a first modification of the solid electrolytic capacitor.

FIG. 7 is a sectional view taken along the same line as the line II-II shown in FIG. 1, and which shows a first modification of the solid electrolytic capacitor. As shown in FIG. 7, a closed end hole 22 may be defined in the conductive plate 2 in place of the through hole 21, and the tip end portion 121 of the anode lead 12 may be inserted into the closed end hole 22. In this case, the tip end portion 121 of the anode lead 12 is electrically connected to the entire inner circumference of the closed end hole 22.

Figure 8:
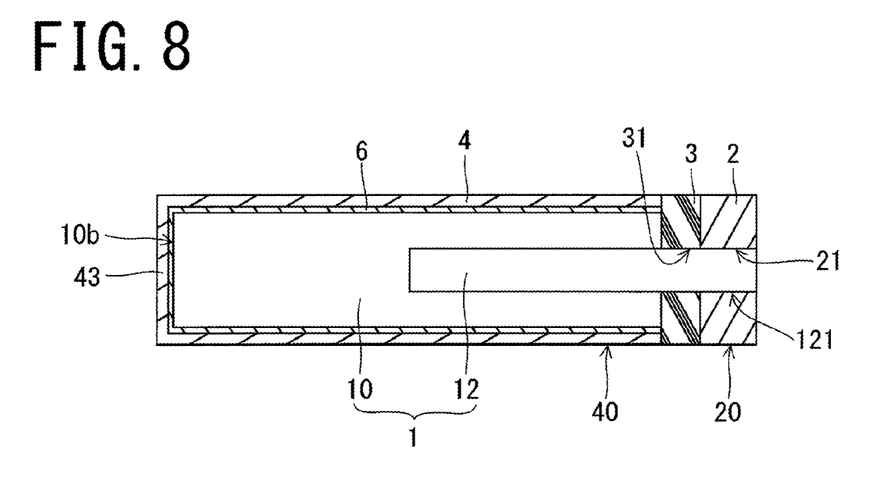
FIG. 8 is a sectional view taken along the same line as the line II-II shown in FIG. 1, and which shows a second modification of the solid electrolytic capacitor.

FIG. 8 is a sectional view taken along the same line as the line II-II shown in FIG. 1, and which shows a second modification of the solid electrolytic capacitor. As shown in FIG. 8, a bottom portion 43 may be provided to the tubular member 4, and the second end surface 10b of the element body 10 may be entirely covered by the bottom portion 43.

In the solid electrolytic capacitor of the second modification, the first end surface 10a of the element body 10 is entirely covered by the electrical insulating plate 3, and the side surface 10c and the second end surface 10b of the element body 10 are entirely covered by the tubular member 4. Thus, the solid electrolytic capacitor of the second modification can protect the capacitor element 1 from moisture, so that the resistance to moisture of the solid electrolytic capacitor is enhanced.

Figure 9:
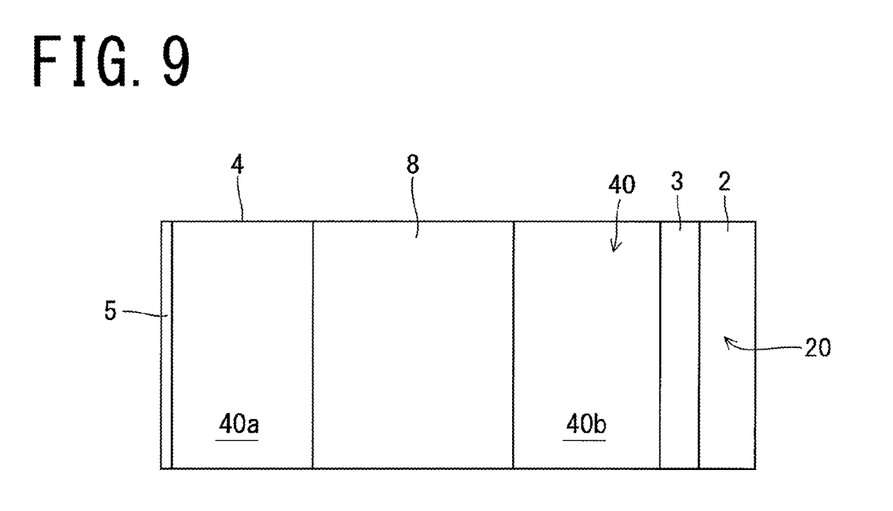
FIG. 9 is a bottom view of a third modification of the solid electrolytic capacitor.

FIG. 9 is a bottom view of a third modification of the solid electrolytic capacitor. As shown in FIG. 9, part of a region of the outer circumference of the tubular member 4 that is to form the cathode terminal surface 40 may be printed to form an electrical insulating layer 8.

Figure 10:
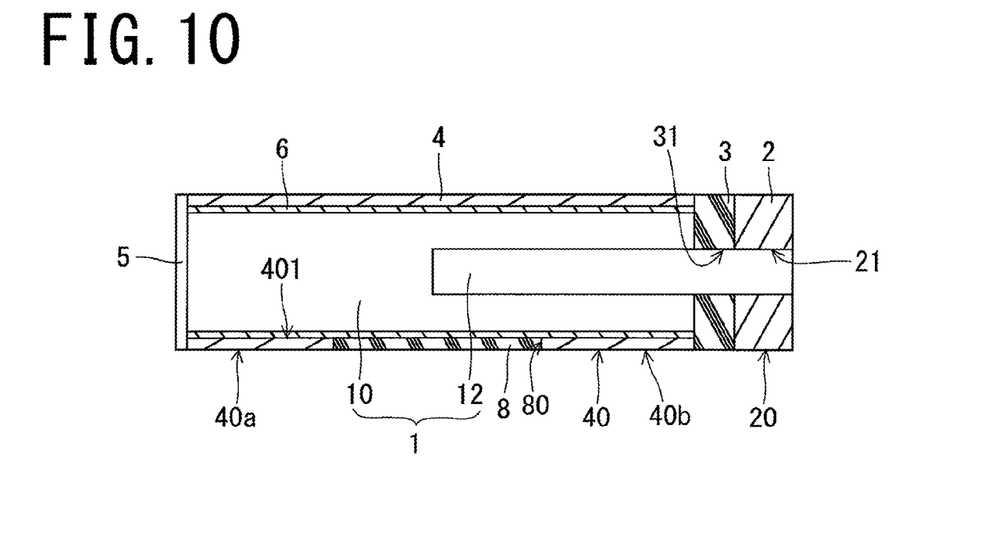
FIG. 10 is a sectional view taken along the same line as the line II-II shown in FIG. 1, and which shows a fourth modification of the solid electrolytic capacitor.

FIG. 10 is a sectional view taken along the same line as the line II-II shown in FIG. 1, and which shows a fourth modification of the solid electrolytic capacitor. As shown in FIG. 10, a window 80 may be defined in a region of the outer circumference of the tubular member 4 that is to form the cathode terminal surface 40. In this case, the window 80 defined in this region extends to reach the inner circumference 401, and which is filled with an electrical insulating material to form the electrical insulating layer 8. So, the window 80 is covered with the electrical insulating film 8.

Thus, the solid electrolytic capacitors of the third and fourth modifications reduce the area of the cathode terminal surface 40, thereby making a difference in area between the cathode and anode terminal surfaces 40 and 20 smaller than those in the solid electrolytic capacitors of the embodiment (FIG. 2), and of the first and second modifications (FIGS. 7 and 8). More specifically, as shown in FIGS. 9 and 10, first and second regions 40a and 40b on opposite sides of the electrical insulating layer 8 to form the cathode terminal surface 40 each have a smaller difference in area from the anode terminal surface 20. This reduces the amount of solder to be applied between the cathode terminal surface 40 and interconnect lines on a circuit board when the solid electrolytic capacitor is soldered to the interconnect lines on the circuit board, so that misalignment of the solid electrolytic capacitor becomes unlikely.

The structure of each part of the invention is not limited to that shown in the embodiment described above. Various modifications can be devised without departing from the technical scope recited in claims. By way of example, part of the side surface 10c of the element body 10 may be covered by the tubular member 4 so the cathode layer 15 of the capacitor element 1 is electrically connected to the inner circumference 401 of the tubular member 4. In this structure, the first end surface 10a of the element body 10 and the open end surface 41 of the tubular member 4 may be aligned in the same plane. All the structures employed in the solid electrolytic capacitor of the embodiment are also applicable to solid electrolytic capacitors of various shapes of cross sections (such as a circle) vertical to the direction 91 in which the anode lead 12 extends.

Further, in the solid electrolytic capacitors of the embodiment and of the modifications, the first end surface 10a of the element body 10 and the open end surface 41 of the tubular member 4 are aligned in the same plane, to which the invention is not limited. As an example, the open end surface 41 of the tubular member 4 may project from the first end surface 10a of the element body 10, and the electrical insulating plate 3 may partially be covered by part of the tubular member 4. This causes the cathode terminal surface 40 to get nearer the anode terminal surface 20 to make a distance between the anode and cathode terminal surfaces 20 and 40 smaller, so that the ESL of a solid electrolytic capacitor is reduced further.

In the solid electrolytic capacitors of the embodiment and of the modifications, the conductive plate 2 may be replaced by conductive members of various shapes including a stick and a cube as well as a plate. The electrical insulating plate 3 may also be replaced by electrical insulating members of various shapes including a stick and a cube as well as a plate.

The invention claimed is:

1. A solid electrolytic capacitor, comprising:
a capacitor element having an element body with a cathode layer that forms at least a partial region of the outer circumference of the element body, and an anode lead pulled out of the element body through the outer circumference of the element body, the outer circumference of the element body being defined by a first end surface through which the anode lead is pulled out, a second end surface opposite the first end surface, and a side surface extending from the outer periphery of the first end surface to the outer periphery of the second end surface;
a conductive member made of a conductive material different from that of the anode lead, and placed to face the first end surface of the element body;
an electrical insulating member placed between the conductive member and the element body; and
a tubular member made of a conductive material different from that of the cathode layer, wherein
a first through hole through which the anode lead passes is defined in the electrical insulating member,
a second through hole or a closed end hole into which a tip end portion of the anode lead is inserted is defined in the conductive member, and the tip end portion of the anode lead is press-fitted into the second through hole or joined to the inner circumference of the closed end hole,
at least part of the element body of the capacitor element is arranged inside the tubular member, while the cathode layer of the capacitor element is connected through a conductive adhesive to the inner circumference of the tubular member, and
an exposed surface of the conductive member forms an anode terminal surface, and the outer circumference of the tubular member forms a cathode terminal surface.

2. The solid electrolytic capacitor according to claim 1, wherein the first end surface of the element body and an open end surface of the tubular member are aligned in the same plane.

3. The solid electrolytic capacitor according to claim 1, wherein the side surface of the element body is entirely covered by the tubular member.

4. The solid electrolytic capacitor according to claim 3, further comprising a covering member for covering the entire second end surface of the element body, wherein the covering member is adhesively fixed to the second end surface of the element body and/or to an open end surface of the tubular member.

5. The solid electrolytic capacitor according to claim 3, wherein the tubular member has a conductive bottom portion formed integrally with the tubular member so as to shape the tubular member into a closed end tubular member, and the second end surface of the element body is entirely covered by the bottom portion.

6. The solid electrolytic capacitor according to claim 1, wherein a window is defined in part of the tubular member extending in the same direction as a direction in which the anode lead extends such that the window penetrates the tubular member from the outer circumference to the inner circumference thereof, and the window is covered with an electrical insulating film.

7. The solid electrolytic capacitor according to claim 1, wherein an electrical insulating layer is formed in a partial region of the outer circumference of part of the tubular member extending in the same direction as a direction in which the anode lead extends.

8. The solid electrolytic capacitor according to claim 1, wherein the capacitor element further has an anode body in which the anode lead is implanted, a dielectric layer formed on a surface of the anode body, and an electrolyte layer formed on the dielectric layer, and the cathode layer is formed on the electrolyte layer.

9. The solid electrolytic capacitor according to claim 4, wherein the covering member has conductivity.

* * * * *